United States Patent

Shibata et al.

[11] Patent Number: 6,066,690
[45] Date of Patent: May 23, 2000

[54] HEAT-VULCANIZABLE RUBBER COMPOSITION

[75] Inventors: Yoshimi Shibata, Uji; Tatsuya Okuno, Kurita-gun, both of Japan

[73] Assignee: Sunstar Giken Kabushiki Kaisha, Osaka, Japan

[21] Appl. No.: 09/043,893

[22] PCT Filed: Sep. 27, 1996

[86] PCT No.: PCT/JP96/02816

§ 371 Date: Mar. 30, 1998

§ 102(e) Date: Mar. 30, 1998

[87] PCT Pub. No.: WO97/12933

PCT Pub. Date: Apr. 10, 1997

[30] Foreign Application Priority Data

Sep. 29, 1995 [JP] Japan ................................. 7-252688

[51] Int. Cl.$^7$ ............................. C08C 19/00; C08F 8/34; C08K 3/00; C08K 3/20; C08K 3/26
[52] U.S. Cl. ......................... 524/413; 524/445; 524/451; 524/522; 524/527; 524/528; 524/515; 525/354; 525/331.8
[58] Field of Search ..................... 525/346, 354, 525/331.8; 524/413, 445, 451, 522, 523, 527, 528, 515

[56] References Cited

U.S. PATENT DOCUMENTS

| | | | |
|---|---|---|---|
| 4,427,452 | 1/1984 | Jeffs ......................................... | 524/262 |
| 4,798,755 | 1/1989 | Yamada et al. .......................... | 428/141 |
| 5,006,603 | 4/1991 | Takaki et al. ............................ | 525/105 |

FOREIGN PATENT DOCUMENTS

| | | |
|---|---|---|
| 52-35235 | 3/1977 | Japan . |
| 59-126441 | 7/1984 | Japan . |
| 5-170975 | 7/1993 | Japan . |

OTHER PUBLICATIONS

Encyclopedia of Chemical Technology, vol. 22, 3rd Ed., John Wiley & Sons, 1983.
Rubber World, published by Rubber/Automotive Division of Hartman Communications, Inc., Feb. 1977.

*Primary Examiner*—Robert Dawson
*Assistant Examiner*—Kuo-Liang Peng
*Attorney, Agent, or Firm*—Jacobson, Price, Holman & Stern, PLLC

[57] ABSTRACT

This application provides a heat vulcanizable rubber composition which prevents scorch in a molding process for the production of vulcanized rubber molded articles, and has good storage stability when the composition is formulated in the form of a one pack pasty composition.

The heat vulcanizable rubber composition of the present invention contains (A) a rubber component having double bonds, and (B) a vulcanizing agent in the solid state at room temperature and a vulcanizing accelerator in the solid state at room temperature, characterized in that the particle surfaces of at least one of the vulcanizing agent and vulcanizing accelerator are treated with a fine powder having a center particle size of 2 $\mu$m or less in a weight ratio of said at least one of the vulcanizing agent and vulcanizing accelerator to the fine powder in the range between 1:0.001 to 1:2, to form the fine powder-treated vulcanizing agent and/or vulcanizing accelerator. This composition is useful as an adhesive, a sealant, a coating material, and a material for molded articles.

8 Claims, No Drawings

HEAT-VULCANIZABLE RUBBER COMPOSITION

FIELD OF THE INVENTION

The present invention relates to a heat vulcanizable rubber composition. In particular, the present invention relates to a heat vulcanizable rubber composition, which comprises a rubber component having a vulcanizable double bond, a vulcanizing agent and a vulcanizing accelerator that are in the solid state at room temperature and induces a vulcanization on heating, and a vulcanizing accelerator, where at least one of the vulcanizing agent and the vulcanizing accelerator is surface treated by a specific method, which is useful as an adhesive, a sealant, a coating material and a material for molded articles, in particular, vulcanized rubber molded articles, and which has excellent anti-scorching properties in a kneading step of a molding method for producing vulcanized rubber molded articles, and good storage stability in a sealed container when supplied as a one-pack pasty composition.

BACKGROUND ART

Heat vulcanizable rubber compositions comprising rubber components which have double bonds and are in the liquid or solid state at room temperature, vulcanizing agents which are in the solid state at room temperature, and vulcanizing accelerators which are in the solid state at room temperature are used in various fields of adhesives, sealants, coating materials, and also molded articles.

When such compositions are used for the production of vulcanized rubber molded materials, kneading for about one hour in the molding process generates mixing heat (to about 60° C.), and causes a scorching problem due to the decomposition of the vulcanizing agent and vulcanizing accelerator by the mixing heat. To prevent such scorching, it is unavoidable to continuously carry out the molding process so that the composition can be quickly transferred to the molding step after the addition of the vulcanizing agent and vulcanizing accelerator. Furthermore, the amounts of the vulcanizing agent and vulcanizing accelerator should be adjusted in accordance with external atmospheres, in particular, temperature, to prevent the scorching problem.

When such compositions are used as adhesives or sealants, the rubber components, which are in the liquid state at room temperature, are used, or they are supplied in a paste state by dissolving them in plasticizers or the like. In such a case, when the composition is prepared in the form of a one pack type by the addition of the vulcanizing agent and vulcanizing accelerator to the rubber component, the vulcanization often proceeds gradually to form a gel during the storage until the use at around 40° C. in the summer season. In this case, the heat vulcanizable rubber compositions are supplied in the form of a two pack type.

Accordingly, for the purpose of preventing scorch in the molding process for the production of vulcanized rubber molded articles, or ensuring the storage stability of the one pack pasty compositions, new components such as premature-vulcanizing-preventing agents (retarders), effective stabilizers, and vulcanizing agent or vulcanizing accelerators having good stability have been developed. However, none of them can achieve the above purpose satisfactorily.

Therefore, it is desired to develop a composition which is a one pack type one containing such a vulcanizing agent and a vulcanizing accelerator, and which does not start a vulcanization due to mixing heat, that is, which can prevent scorching, and thus has good storage stability.

DESCRIPTION OF THE INVENTION

The present inventors have made studies for solving such problems, and found that, when the specific amount of a fine powder having a specific center particle size is adhered to the surfaces of at least one of a vulcanizing agent in the solid state at room temperature and a vulcanizing accelerator in the solid state at room temperature, both of which contribute to the vulcanization, the vulcanizing agent and/or vulcanizing accelerator do not induce the undesirable vulcanization in the process of the compounding of the composition or the production of molded articles. When the composition is heated and vulcanized usually at a temperature of between 110 and 250° C., the vulcanizing agent and/or vulcanizing accelerator are molten and then activated, and the desired vulcanization proceeds. Thus, the present invention has been completed.

Accordingly, the present invention provides a heat vulcanizable rubber composition comprising (A) a rubber component having a vulcanizable double bond, and (B) a vulcanizing agent in the solid state at room temperature and a vulcanizing accelerator in the solid state at room temperature, wherein the particle surfaces of at least one of the vulcanizing agent and vulcanizing accelerator (hereinafter referred to as "vulcanizing agent and the like") are covered with a fine powder having a center particle size of 2 $\mu$m or less in a weight ratio of said at least one of the vulcanizing agent and vulcanizing accelerator to said fine powder in the range between 1:0.001 to 1:2, to form the fine powder-treated vulcanizing agent and/or vulcanizing accelerator.

In the present invention, the rubber component (A) may be any known rubber which is in the solid or liquid state at room temperature. Examples of the rubbers are natural rubbers, 1,4-polybutadiene rubber, polybutadiene-isoprene rubber, acrylonitrile-butadiene copolymer rubber, poly-1,2-butadiene rubber, 1,2-butadiene copolymer rubber, polyisoprene rubber, styrene-butadiene copolymer rubber, chloroprene rubber, ethylene-propylene-diene copolymer rubber, acrylonitrile-isoprene copolymer rubber, and the like. They may be used independently or in admixture of two or more of them.

Among the vulcanizing agent and the like (B), examples of the vulcanizing agent in the solid state at room temperature are sulfur (e.g. powder sulfur, precipitated sulfur, colloidal sulfur, insoluble sulfur, etc.), thiurams (e.g. tetramethylthiuram disulfide, tetraethylthiuram disulfide, tetramethylthiuram monosulfide, N,N'-dimethyl-N,N'-diphenylthiuram disulfide, N,N'-dioctadecyl-N,N'-diisopropylthiuram disulfide, dipentamethylenethiuram disulfide, dipentamethylenethiuram monosulfide, dipentamethylenethiuram tetrasulfide, dipentamethylenethiuram hexasulfide, etc.), dithiocarbamates (e.g. zinc dimethyldithiocarbamate, zinc diethyldithiocarbamate, zinc dibutyldithiocarbamate, zinc diamyldithiocarbamate, zinc dipropyldithiocarbamate, complex salt of zinc pentamethylenedithiocarbamate and piperidine, zinc hexadecyl- or octadecyl-isopropyldithiocarbamate, zinc dibenzyldithiocarbamate, sodium diethyldithiocarbamate, piperidine pentamethylenedithiocarbamate, selenium dimethyldithiocarbamate, tellurium diethyldithiocarbamate, cadmium diamyldithiocarbamate, etc.), and other organic sulfur compounds (e.g. 4,4'-dithiodimorpholine, N,N'-dithio-bis(hexahydro-2H-azepinone-2), alkylphenol disulfides, etc.). They may be used independently or in admixture of two or more of them. Among the above vulcanizing agents, the thiurams and dithiocarbamates sufficiently function also as vulcanizing accelerators.

Among the vulcanizing agent and the like (B), examples of the vulcanizing accelerator in the solid state at room temperature are the above thiurams and dithiocarbamate, and also aldehyde-ammonia compounds (e.g. hexamethylenetetramine, acetaldehyde ammonia, condensate of butylaldehyde and monobutylamine, etc.), guanidines (e.g. 1,3-diphenylguanidine, di-o-tolylguanidine, 1-o-tolylbiguanide, dicatecolboric acid salt of di-o-tolylguanidine, etc.), thiazoles (e.g. 2-mercaptobenzothiazole, dibenzothiazyl disulfide, sodium salt, zinc salt, copper salt and cyclohexyl amine salt of 2-mercaptobenzothiazole, 2-(2',4'-dinitrophenylthio) benzothiazole, 2-(N,N'-diethyldithiocarbamoylthio) benzothiazole, etc.), sulfenamides (e.g. N-cyclohexyl-2-benzothiazylsulfenamide, N-tert.-butyl-2-benzothiazylsulfenamide, N,N-dicyclohexyl-2-benzothiazylsulfenamide, N-oxydiethylene-2-benzothiazylsulfenamide, 2-(4'-morpholinodithio) benzothiazole, etc.), thioureas (e.g. N,N'-diphenylthiourea, di-o-tolylthiourea, etc.), aminodithiophosphate, dimethyidithiomorpholine, and the like. They may be used independently or in admixture of two or more of them.

The melting point of such vulcanizing agent and the like (B) is at least 60° C., preferably at least 80° C. in view of the good scorch prevention, and its upper limit is selected in accordance with the maximum temperature employed for the vulcanizing.

The vulcanizing agent and the like (B) may contain any material that can contribute to the vulcanization, for example, metal oxide powder (e.g. zinc oxide, magnesium oxide, zinc peroxide, lead peroxide, etc.), and so on.

As described above, it is important that at least one of the vulcanizing agent and the like (B) is surface treated with the fine powder. The fine powder treatment can be carried out by (i) a shear frictional mixing method by which the vulcanizing agent and/or vulcanizing accelerator in the solid state at room temperature (hereinafter referred to as "matrix particles") are ground and mixed together with the fine powder for adhering the fine powder to the surfaces of the matrix particles, or (ii) a mixing and grinding method comprising mixing and grinding the matrix particles and the fine powder together using a high speed impact type mixing apparatus (for example, a jet mill) or a compression shear type mixing apparatus. In particular, the mixing with the high speed impact type mixing apparatus is preferable. When the vulcanizing agent and the like (B) contain the above metal oxide powder or the like, the metal oxide powder can be surface treated with the fine powder, like the vulcanizing agent and the like (B).

As the fine powder, any inorganic or organic powder can be used. Examples of the inorganic powder are titanium oxide, calcium carbonate, clay, silica, zirconia, carbon, alumina, talc, and the like, and examples of the organic powder are polyvinyl chloride, polyacrylic resins, polystyrene, polyethylene, and the like. They may be used independently or in admixture of two or more of them.

The center particle size of the fine powder which is adhered to the surfaces of the matrix particles is 2 $\mu$m or less, preferably 1 $\mu$m or less. When the center particle size exceeds 2 $\mu$m, the fine powder may not be adhered to the surfaces of the matrix particles. Preferably, the particle size of the fine powder is from 0.1 to 20% of the particle size of the matrix particles.

The amount of the fine powder is selected so that the weight ratio of the matrix particles to the fine powder is in the range between 1:0.001 and 1:2, preferably between 1:0.002 and 1:1. When the ratio of the fine powder is less than 0.001, the effects for improving the storage stability and scorch prevention are not attained. When the ratio of the fine powder exceeds 2, the storage stability and scorch prevention are not improved further.

The heat vulcanizable rubber composition of the present invention comprises the above rubber component (A), and the vulcanizing agent and the like (B) at least one of which is treated with the fine powder. A typical composition can be prepared by mixing and uniformly dispersing, as the essential components, 10 to 90 wt. % of the rubber component (A) and 1 to 10 wt. % of the vulcanizing agent and the like (B) at least one of which is treated with the fine powder, and optionally 0 to 25 wt. % of softeners (e.g. naphthenic, paraffinic or aromatic process oils, adipate, phthalate or alkylbenzene base plasticizers, etc.), 0 to 70 wt. % of fillers (e.g. calcium carbonate, clay, talc, silica, etc.), 0 to 5 wt. % of foaming agents (e.g. organic foaming agents such as azodicarbonamide, azobisisobutyronitrile, dinitrosopentamethylenetetramne, 4,4'-oxybisbenzenesulfonylhydrazide, hydrazodicarbonamide, p-toluenesulfonylacetonehydrazone, etc.; inorganic foaming agents such as $NaHCO_3$; microballoons comprising a gas such as n-butane, isobutane, etc. encapsulated in a shell made of a vinylidene chloride-acrylonitrile copolymer; and the like), as well as suitable amounts of stabilizers (e.g. metal soaps of zinc, barium, etc., organic tin stabilizers, antioxidants, UV light absorbers, and the like), thixotropic agents (e.g. fine powder silica, bentonite, and the like), colorants (e.g. titanium oxide, carbon black, and the like), moisture-absorbers (e.g. CaO, $Al_2O_3$, $CaCl_2$, and the like), and organic solvents (e.g. toluene, xylene, aliphatic hydrocarbons, and the like). For use, the composition is heat vulcanized at a temperature of between 110 and 250° C. for 10 to 30 minutes, and thus a vulcanized material having desired physical properties is obtained.

When the amount of the rubber component (A) is less than 10 wt. %, the sufficient rubbery properties may not be attained. The upper limit of 90 wt. % is determined from the relationship with the amounts of other components.

When the amount of the vulcanizing agent and the like (B) at least one of which is treated with the fine powder is less than 1 wt. %, the vulcanizing may not proceed sufficiently, and the composition may be insufficiently vulcanized. When the amount of the vulcanizing agent and the like (B) exceeds 10 wt. %, the vulcanized material may become too hard, and may not exhibit rubbery properties.

When the amount of the softeners exceeds 25 wt. %, the softeners may be extracted, and thus the physical properties tend to deteriorate.

When the amount of the fillers exceeds 70 wt. %, the physical properties tend to deteriorate, or the viscosity tends to increase.

When the amount of the foaming agents exceeds 5 wt. %, the gas escapes through the surface during vulcanizing, and the appearance of the vulcanized material tends to deteriorate, or the foam cells become continuous. Thus, the formation of a closed cell layer may be difficult, and the physical properties of the vulcanized material tend to deteriorate.

BEST MODE FOR CARRYING OUT THE INVENTION

Now, the present invention will be illustrated by Preparation Examples (preparation of fine powder-treated materials), Examples and Comparative Examples.

Prepartion Example 1

1-o-Tolylbiguanide (NOKCELLER BG available from OUCHI SHINKO CHEMICAL INDUSTRIES, Ltd.; melting point, higher than 140° C.) as a vulcanizing accelerator, and titanium oxide (JR-602 available from TEIKOKU KAKO Co., Ltd.; center particle size, 0.27 µm) as a fine powder were mixed in a weight ratio of 1:0.5, and ground with a jet mill. Thus, a fine powder-treated vulcanizing accelerator having a center particle size of about 10 µm was obtained.

Prepartion Example 2

Tetramethylthiuram monosulfide (NOKCELLER TS available from OUCHI SHINKO CHEMICAL INDUSTRIES, Ltd.; melting point, higher than 103° C.) as a vulcanizing accelerator, and titanium oxide (JR-602) as a fine powder were mixed in a weight ratio of 1:1, and ground with a jet mill. Thus, a fine powder-treated vulcanizing accelerator having a center particle size of about 10 µm was obtained.

Prepartion Example 3

Insoluble sulfur (SANFEL #90 available from SANSHIN CHEMICAL INDUSTRIES, Ltd.; melting point, 115° C.) as a vulcanizing agent, and titanium oxide (JR-602) were mixed in a weight ratio of 1:1, and ground with a jet mill. Thus, a fine powder-treated vulcanizing accelerator having a center particle size of about 10 µm was obtained.

Prepartion Example 4

1-o-Tolylbiguanide (NOKCELLER BG) as a vulcanizing accelerator, and silica as a fine powder were mixed in a weight ratio of 1:1, and ground with a jet mill. Thus, a fine powder-treated vulcanizing accelerator having a center particle size of about 10 µm was obtained.

Prepartion Example 5

1-o-Tolylbiguanide (NOKCELLER BG) as a vulcanizing accelerator, and polyvinyl chloride powder having a center particle size of about 0.3 µm) as a fine powder were mixed in a weight ratio of 1:0.5, and ground with a jet mill. Thus, a fine powder-treated vulcanizing accelerator having a center particle size of about 10 µm was obtained.

Prepartion Example 6

Dibenzothiazyl disulfide (NOKCELLER DM available from OUCHI SHINKO CHEMICAL INDUSTRIES, Ltd.; melting point, higher than 170° C.) as a vulcanizing accelerator, and titanium oxide (JR-602) as a fine powder were mixed in a weight ratio of 1:1, and ground with a jet mill. Thus, a fine powder-treated vulcanizing accelerator having a center particle size of about 10 µm was obtained.

EXAMPLES 1–7 AND COMPARATIVE EXAMPLE 1

Components were selected from the following materials in amounts (wt. parts) shown in Table 1 and mixed with a chemistirrer, and a one-pack type pasty composition was obtained:

Rubber component:

liquid butadiene-isoprene rubber (LIR-390 available from KURARAY Co., Ltd.);

Vulcanizing agents:

Insoluble sulfur (SANFEL #90), and the fine powder-treated vulcanizing agent of Preparation Example 3;

Vulcanizing accelerators:

Tetramethylthiuram monosulfide (NOKCELLER TS), dibenzothiazyl disulfide (NOKCELLER DM), 1-o-tolylbiguanide (NOKCELLER BG), and fine powder-treated vulcanizing accelerators of Preparation Examples 1, 2 and 4–6;

Filler:

Calcium carbonate (WHITON B available from SHIRAISHI CALCIUM Co., Ltd.);

Softener:

Process oil (PROCESS OIL NM-26 available from IDEMITSU OIL Co., Ltd.).

TABLE 1

|  | Example No. | | | | | | | Comp. |
| --- | --- | --- | --- | --- | --- | --- | --- | --- |
|  | 1 | 2 | 3 | 4 | 5 | 6 | 7 | Ex. 1 |
| Rubber component | | | | | | | | |
| Liq. polybutadiene-isoprene rubber | 50 | 50 | 50 | 50 | 50 | 50 | 50 | 50 |
| Vulcanizing agent | | | | | | | | |
| Insoluble sulfur | 2.5 | 2.5 | — | — | 2.5 | 2.5 | — | 2.5 |
| Preparation Example 3 | — | — | 5 | 5 | — | — | 2.5 | — |
| Vulcanizing accelerator | | | | | | | | |
| Tetramethylthiuram monosulfide | 0.5 | — | 0.5 | 0.5 | 0.5 | 0.5 | — | 0.5 |
| Dibenzothiazyl disulfide | 2.5 | 2.5 | 2.5 | 2.5 | 2.5 | 2.5 | — | 2.5 |
| 1-o-Tolylbiguanide | — | 0.7 | 0.7 | — | — | — | — | 0.7 |
| Preparation Example 1 | 1.05 | — | — | 1.05 | — | — | 1.05 | — |
| Preparation Example 2 | — | 1.0 | — | — | — | — | 1 | — |
| Preparation Example 4 | — | — | — | — | 1.05 | — | — | — |
| Preparation Example 5 | — | — | — | — | — | 1.05 | — | — |
| Preparation Example 6 | — | — | — | — | — | — | 5 | — |
| Filler | 30 | 30 | 30 | 30 | 30 | 30 | 30 | 30 |
| Softener | 14 | 14 | 14 | 14 | 14 | 14 | 14 | 14 |

Performance Tests (1) Storage stability

The composition obtained in each of Examples 1–7 and Comparative Example 1 is stored in a sealed vessel at 40° C., and increased viscosities with time are measured (with the viscosity just prior to the storage being 100). The results are shown in Table 2.

(2) Vulcanizing characteristics before storage

The composition obtained in each of Examples 1–7 and Comparative Example 1 is treated on a release paper to a film thickness of 3 mm, and thermally vulcanized at 160° C. for 20 minutes. Then, the physical properties of the vulcanized film in the form of a JIS No. 3 dumbbell were measured. The results are shown in Table 2.

(3) Vulcanizing characteristics after storage

The composition obtained in each of Examples 1–7 and Comparative Example 1 is stored in a sealed vessel at 40° C. Then, the composition treated on a release paper to a film thickness of 3 mm, and thermally vulcanized at 160° C. for 20 minutes, and the physical properties of the vulcanized film in the form of a JIS No. 3 dumbbell were measured. The results are shown in Table 2.

TABLE 2

| | | Example No. | | | | | | | Comp. |
|---|---|---|---|---|---|---|---|---|---|
| | | 1 | 2 | 3 | 4 | 5 | 6 | 7 | Ex. 1 |
| (1) | Storage stability at 40° C. | | | | | | | | |
| | after 1 day | 105 | 100 | 105 | 100 | 100 | 100 | 100 | 110 |
| | after 7 days | 110 | 105 | 110 | 105 | 103 | 110 | 103 | 135 |
| | after 14 days | 113 | 112 | 140 | 110 | 115 | 120 | 115 | 220 |
| | after 21 days | 170 | 161 | 180 | 130 | 150 | 170 | 135 | Gelled |
| (2) | Vulcanizing characteristics (160° C. × 20 m.) before storage Physical properties of No. 3 dumbbell | | | | | | | | |
| | Strength at break (kg/cm²) | 7.3 | 7.5 | 7.5 | 7.4 | 7.5 | 7.4 | 7.3 | 7.4 |
| | Elongation at break (%) | 60 | 55 | 60 | 55 | 60 | 65 | 60 | 55 |
| (3) | Vulcanizing characteristics (160° C. × 20 m.) after storage (40° C. × 14 days) Physical properties of No. 3 dumbbell | | | | | | | | |
| | Strength at break (kg/cm²) | 7.2 | 7.3 | 7.0 | 7.3 | 7.2 | 7.1 | 7.3 | 3.5 |
| | Elongation at break (%) | 55 | 60 | 45 | 55 | 60 | 60 | 60 | 90 |

Industrial Applicability

With the compositions of the present invention (Examples 1–7), gelation (comparable with the scorching in the application for molded articles) does not occur after the storage at 40° C. for 21 days, while maintaining the physical properties of the heat vulcanized materials (at 160° C. for 20 min.) at the certain levels. Furthermore, no significant deterioration of the physical properties are recognized after storage at 40° C. for 14 days, unlike the composition of Comparative Example 1.

We claim:

1. A heat vulcanizable rubber composition comprising (A) a rubber component having a double bond, and (B) a vulcanizing agent in the solid state at room temperature and a vulcanizing accelerator in the solid state at room temperature, wherein the particle surfaces of at least one of the vulcanizing agent and vulcanizing accelerator are treated with a fine powder having a center particle size of 2 μm or less in a weight ratio of said at least one of the vulcanizing agent and vulcanizing accelerator to said fine powder in the range between 1:0.001 to 1:2, to form the fine powder-treated vulcanizing agent and/or vulcanizing accelerator.

2. A heat vulcanizable rubber composition according to claim 1, wherein said vulcanizing agent and vulcanizing accelerator has a melting point of at least 60° C.

3. A heat vulcanizable rubber composition according to claim 1, wherein said fine powder is at least one powder selected from the group consisting of titanium oxide, calcium carbonte, clay, silica, zirconia, carbon, alumina, talc, polyvinyl chloride, polyacrylic resins, polystyrene, and polyethylene.

4. A heat vulcanizable rubber composition according to claim 1, which comprises 10 to 90 wt. parts of said rubber component (A), and 1 to 10 wt. % of said vulcanizing agent and vulcanizing accelerator at least one of which is treated with a fine powder.

5. A heat-vulcanizable rubber composition according to claim 2, wherein said fine powder is at least one powder selected from the group consisting of titanium oxide, calcium carbonate, clay, silica zirconia, carbon, alumina, talc, polyvinyl chloride, polyacrylic resins, polystyrene, and polyethylene.

6. A heat-vulcanizable rubber composition according to claim 2, which comprises 10 to 90 wt parts of said rubber component (A), and 1 to 10 wt % of said vulcanizing agent and vulcanizing accelerator at least one of which is treated with a fine powder.

7. A heat-vulcanizable rubber composition according to claim 3, which comprises 10 to 90 wt parts of said rubber component (A), and 1 to 10 wt % of said vulcanizing agent and vulcanizing accelerator at least one of which is treated with a fine powder.

8. A heat vulcanizable rubber composition according to claim 1, wherein said fine powder is at least one powder selected from the group consisting of titanium oxide, carbon, alumina, talc, polyvinyl chloride, polyacrylic resins, and polyethylene.

* * * * *